(12) United States Patent
Mahaffy et al.

(10) Patent No.: US 8,164,213 B2
(45) Date of Patent: Apr. 24, 2012

(54) ORBITAL TRACK WIND TURBINE

(75) Inventors: Kevin E. Mahaffy, Adelanto, CA (US);
Eric E. Schmidt, Adelanto, CA (US);
Ricky Howard, Adelanto, CA (US);
Byron Henning, Adelanto, CA (US)

(73) Assignee: Exquadrum, Inc., Adelanto, CA (US)

( * ) Notice: Subject to any disclaimer, the term of this patent is extended or adjusted under 35 U.S.C. 154(b) by 454 days.

(21) Appl. No.: 12/508,127

(22) Filed: Jul. 23, 2009

(65) Prior Publication Data
US 2011/0018280 A1 Jan. 27, 2011

(51) Int. Cl.
*F03D 9/00* (2006.01)
*H02P 9/04* (2006.01)
*F03B 9/00* (2006.01)

(52) U.S. Cl. ............................. 290/55; 290/44; 416/17

(58) Field of Classification Search .............. 290/44, 290/55; 416/17
See application file for complete search history.

(56) References Cited

U.S. PATENT DOCUMENTS

| | | | | |
|---|---|---|---|---|
| 206,631 A * | 7/1878 | Smith | ............................. | 416/117 |
| 665,810 A * | 1/1901 | Stretch | ............................. | 290/55 |
| 1,201,184 A * | 10/1916 | Holben | ............................. | 416/17 |
| 1,766,765 A * | 6/1930 | Savonius | ............................. | 416/132 R |
| 3,504,988 A * | 4/1970 | Stenner | ............................. | 416/9 |
| 4,168,439 A * | 9/1979 | Palma | ............................. | 290/44 |
| 4,178,126 A * | 12/1979 | Weed | ............................. | 416/17 |
| 4,203,707 A * | 5/1980 | Stepp | ............................. | 416/119 |
| 4,247,252 A * | 1/1981 | Seki et al. | ............................. | 416/44 |
| 4,247,253 A * | 1/1981 | Seki et al. | ............................. | 416/44 |
| 4,248,568 A * | 2/1981 | Lechner | ............................. | 416/132 B |
| 4,285,636 A * | 8/1981 | Kato et al. | ............................. | 416/197 A |
| 4,289,970 A * | 9/1981 | Deibert | ............................. | 290/44 |
| 4,299,537 A * | 11/1981 | Evans | ............................. | 416/119 |
| 4,318,019 A * | 3/1982 | Teasley et al. | ............................. | 310/156.35 |
| 4,330,714 A * | 5/1982 | Smith | ............................. | 290/55 |
| 4,527,950 A * | 7/1985 | Biscomb | ............................. | 416/117 |
| 4,530,642 A * | 7/1985 | Yang | ............................. | 416/119 |
| 4,619,585 A * | 10/1986 | Storm | ............................. | 416/132 B |
| 4,692,631 A * | 9/1987 | Dahl | ............................. | 290/55 |
| 4,832,569 A * | 5/1989 | Samuelsen et al. | ............................. | 416/17 |
| 5,226,806 A * | 7/1993 | Lubbers | ............................. | 416/132 B |
| 5,302,084 A * | 4/1994 | Nelson | ............................. | 416/17 |
| 5,632,599 A * | 5/1997 | Townsend | ............................. | 416/42 |
| 5,758,911 A * | 6/1998 | Gerhardt | ............................. | 290/55 |
| 5,783,894 A * | 7/1998 | Wither | ............................. | 310/266 |
| 5,863,180 A * | 1/1999 | Townsend | ............................. | 416/42 |
| 5,992,341 A * | 11/1999 | Gerhardt | ............................. | 114/102.16 |
| 6,672,522 B2 * | 1/2004 | Lee et al. | ............................. | 290/55 |
| 6,992,402 B2 * | 1/2006 | Latyshev | ............................. | 290/55 |
| 7,075,191 B2 * | 7/2006 | Davison | ............................. | 290/54 |

(Continued)

*Primary Examiner* — Pedro J Cuevas
(74) *Attorney, Agent, or Firm* — Townsend & Banta

(57) ABSTRACT

An orbital track wind turbine for generation of electrical energy from wind power is provided. The wind turbine includes a plurality of spaced vertical supports to which at least two parallel spaced circular tracks are fixedly secured. These circular tracks are coaxial with one another and are positioned in parallel horizontal planes. A plurality of trucks extend between the circular tracks, the trucks having at least two grooved rollers which partially surround the circular tracks and operate in rolling engagement therewith. A circular power takeoff ring is coaxial with said circular tracks, and the power takeoff ring is attached to the truck which is rotatable in a horizontal plane about its central axis. A plurality of vertical airfoils extends around the circular power takeoff ring, with each of the airfoils being attached to a truck and the power takeoff ring. One or more generators are connected to the power takeoff ring, thereby converting wind generated rotation of the power takeoff ring to electrical energy.

20 Claims, 15 Drawing Sheets

U.S. PATENT DOCUMENTS

| | | | |
|---|---|---|---|
| 7,144,214 B2 * | 12/2006 | Kinpara et al. | 415/4.4 |
| 7,182,573 B2 * | 2/2007 | Jonsson | 415/183 |
| 7,215,038 B2 * | 5/2007 | Bacon | 290/55 |
| 7,323,791 B2 * | 1/2008 | Jonsson | 290/55 |
| 7,345,377 B2 * | 3/2008 | Bacon | 290/55 |
| 7,358,624 B2 * | 4/2008 | Bacon | 290/55 |
| 7,385,302 B2 * | 6/2008 | Jonsson | 290/54 |
| 7,417,334 B2 * | 8/2008 | Uchiyama | 290/55 |
| 7,453,166 B2 * | 11/2008 | Power et al. | 290/54 |
| 7,518,259 B2 * | 4/2009 | Leijon et al. | 290/54 |
| 7,550,865 B2 * | 6/2009 | Jonsson | 290/55 |
| 7,604,454 B2 * | 10/2009 | Power et al. | 415/3.1 |
| 7,605,486 B2 * | 10/2009 | Bridwell | 290/43 |
| 7,902,684 B2 * | 3/2011 | Davison et al. | 290/44 |
| 7,942,624 B1 * | 5/2011 | Erb | 415/4.2 |
| 7,944,069 B2 * | 5/2011 | Uchiyama | 290/44 |
| 2007/0040385 A1 * | 2/2007 | Uchiyama | 290/44 |
| 2009/0220339 A1 * | 9/2009 | Wu et al. | 416/1 |

* cited by examiner

ORBITAL TRACK WIND TURBINE

STATEMENT OF GOVERNMENT INTEREST

This invention was in part made with government support under contract No. 2008-33610-18889 awarded by the United States Department of Agriculture. The government has certain rights in the invention.

BACKGROUND OF THE INVENTION

1. Field of the Invention

The present invention relates in general to the conversion of wind energy to electrical energy and, more particularly, to an orbital track wind turbine which provides a highly efficient method and apparatus for the conversion of wind energy to electrical energy.

2. Description of Related Art

It has become increasingly important due to environmental and economic considerations for the United States to transition from fossil fuels to renewable energy. Unless wind power is cost competitive, no amount of political action can make it successful in the long term. The primary and overriding issue in transition to wind power is the cost per kilowatt-hour of electrical power produced by wind in comparison to more conventional electric power generation systems.

Windmills have been used to pump water for literally thousands of years. In the United States, two and three-bladed, horizontal axis wind turbines are currently in use in California. A large number of such wind farms are currently located on certain mountain ranges and passes in California which have substantial wind velocities. High-speed, two-bladed, horizontal axis wind turbines can achieve power coefficients slightly greater than 45% at tip speed ratios approximating 6. Due to its high performance, this general approach, whether using two blades or three, has therefore been the primary focus of wind energy research and development.

A vertical type wind rotor design is disclosed in U.S. Pat. No. 1,766,765 to Savonius. The Savonius turbine is primarily a drag-type wind turbine. The rotor in Savonius comprises two oppositely curved vanes overlapping each other in the center, there being a gap between insides of the vanes. Savonius solved the problem of improperly designed turbines which create a partial vacuum behind the rotors. Savonius' solution was to allow a pathway for ram air from the downwind (power stroke side) to bleed over the upwind (power robbing side). However, it has been demonstrated that in the turbines of Savonius the tip speed of the turbines is never faster than the wind, resulting in lower efficiencies. State of the art wind turbines are lift devices with airfoils that move at a velocity that is faster than that of the wind.

Engineers have continued to design larger turbines, on ever taller towers. However, there may be limits to this approach. The Department of Energy recently indicated in a 2008 report that, "Many turbine designers do not expect the rotors of land-based turbines to become much larger than about 100 meters in diameter, with corresponding outputs of about 3 MW-5 MW".

The nature of multiple turbine interference and incentives for larger swept areas at greater heights inspired the evolution of a cylinder shaped swept area, resembling that of a traditional H-rotor (VAWT) design shown in FIG. 1. One of the problems with the H-rotor is the long radial supports, which create drag and interfere with the turbine's efficiency. Therefore, engineers have realized that there is a major issue of wind interference in H-rotor designs involving the use of long radial arms to connect the blades to a central axis. As a result, it has been found that the H-rotor wind turbines are typically about one-third less efficient than wind turbines employing a horizontal rotor.

The metamorphosis of a pyramid design, first into a steeper sided shape, eventually led to the realization that a simple cylindrical geometry would provide the best blend of both aerodynamic and mechanical optimization. In addition, the wind industry desires to move from multiple turbines on one tower to a single large turbine. This approach eliminates interference associated with multiple towers, while still allowing for a large swept area.

It is therefore the principal object of the present invention to provide a wind turbine which can utilize large blades without the use of long radial arms connecting the blades to a central axis.

It is another object of the present invention to provide a wind turbine capable of achieving efficiency of wind conversion much higher than the efficiency achieved with conventional horizontal and vertical rotor wind turbines currently in use.

It is yet another object of the present invention to provide a wind turbine which can be scaled to much larger sizes and with greater efficiency than the conventional horizontal axis wind turbines currently in use.

It is still another object of the present invention to provide a new and improved wind turbine which is insensitive to wind direction, requires no long cantilevered rotor blades, and which uses low-cost and lightweight airfoils of constant cross-section. These airfoils are much lower cost to manufacture as compared to complex horizontal axis wind turbine airfoils.

It is another object of the present invention to provide a wind turbine that produces electric power at a lower cost per megawatt hour than the current wind turbine in use and which has a lower tower and footing cost than the current wind turbines in use, and in which the high maintenance items such as gear boxes and generators are located nearer the ground for convenience of maintenance.

BRIEF SUMMARY OF THE INVENTION

The present inventor through extensive analysis of prior art wind turbines and further research and development unexpectedly discovered that an orbital track wind turbine would overcome the problems discussed above concerning the prior art, while at the same time achieving the stated objects of the present invention.

The orbital track wind turbine of the present invention employs a plurality of spaced vertical supports with at least two parallel spaced circular tracks fixedly secured to these vertical supports. Preferably, the circular tracks are coaxial and are positioned in parallel horizontal planes. A plurality of trucks extend between the circular tracks and have at least two grooved rollers which partially surround said circular track and operate in rolling engagement therewith. These grooved rollers on the truck facilitate rotation of the trucks around the circular track while at the same time securing and holding the truck on the circular tracks. The tracks are held on to the circular track mechanically and by means of the centripetal acceleration of the airfoil assembly.

Preferably the circular parallel tracks are formed from steel pipe. However, in another preferred embodiment, the orbital track rail can employ a conventional magnetic levitation (Maglev) type of track.

A circular power takeoff ring is provided which is coaxial with the circular tracks. The circular power takeoff ring is attached to said trucks and is rotatable in a horizontal plane. A plurality of vertical airfoils extend around the circular track, and each of these airfoils are attached to the truck and the power takeoff ring.

Preferably, a plurality of generators are connected to the power takeoff ring whereby to convert wind generated rotation of the power takeoff ring to electrical energy. In a preferred embodiment generators are used which can be converted to dynamotors. These dynamotors can be used to initiate rotation of the power takeoff ring at low wind velocities.

In a preferred embodiment, the wind turbine of the present invention is mounted on a surface of the earth where a solid foundation can be provided for vertical supports upon which the wind turbine rests. However, in another preferred embodiment, the wind turbine of the present invention can be mounted on a floating platform which is preferably anchored to the sea or lake bed.

In a first preferred embodiment, there is provided an orbital track wind turbine for generation of electrical energy from wind power, said wind turbine comprising:
(a) a plurality of spaced vertical supports;
(b) at least two parallel spaced circular tracks fixedly secured to said vertical supports, said circular tracks being coaxial with one another and positioned in parallel horizontal planes;
(c) a plurality of trucks extending between said circular tracks, each of said trucks having at least two grooved rollers which partially surround said circular tracks and operate in rolling engagement therewith;
(d) a circular power takeoff ring coaxial with said circular tracks, said circular power takeoff ring being attached to said truck and being rotatable in a horizontal plane about its central axis;
(e) a plurality of vertical airfoils extending around said circular tracks, each of said airfoils being attached to a truck and said power takeoff ring;
(f) one or more generators being rotatably connected to said power takeoff ring, whereby wind power striking the airfoils causes rotational movement of both the airfoils and attached power takeoff ring and conversion of wind generated rotation of the power takeoff ring and generator to electrical energy.

In a second preferred embodiment, there is provided in connection with the first preferred embodiment, an improvement wherein the circular tracks and power takeoff ring are formed from round steel pipe.

In a third preferred embodiment, there is provided in connection with the first preferred embodiment, an improvement wherein said spaced circular tracks have approximately the same diameter, and the circular power takeoff ring is rotatable in a substantially horizontal plane between the spaced circular tracks.

In a fourth preferred embodiment, there is provided in connection with the first preferred embodiment, an improvement wherein said grooved rollers on the truck are formed of steel and have chamfered walls of between about 30-60 degrees, whereby to transmit both gravitational loads of the mass of the truck and airfoil, and the centripetal loads of the airfoil, truck and power takeoff ring.

In a fifth preferred embodiment, there is provided in connection with the fourth preferred embodiment, an improvement wherein each truck has attached thereto a pair of vertically extending airfoils.

In a sixth preferred embodiment, there is provided in connection with the fifth preferred embodiment, an improvement wherein said pair of vertical airfoils are pivotal along their vertical axis, whereby adjustment of the pitch of the airfoils can be made to facilitate the most efficient capture of wind power by the airfoils.

In a seventh preferred embodiment, there is provided in connection with the sixth preferred embodiment, an improvement wherein each pair of vertical airfoils are pivotal along their vertical axis until the leading edges thereof approach one another, and the cross-section of these airfoils form a V-shape to facilitate initiation of rotation.

In an eighth preferred embodiment, there is provided in connection with the first preferred embodiment, an improvement wherein said generator is a dynamotor which can be operated as a motor to initiate rotation of the power takeoff ring when there is insufficient wind to initiate operation of the wind turbine.

In a ninth preferred embodiment, there is provided in connection with the first preferred embodiment, an improvement wherein the diameter of the spaced circular tracks is larger than the diameter of the vertical supports, and there is an annular space between the circular tracks and the vertical supports.

In a tenth preferred embodiment, there is provided in connection with the ninth preferred embodiment, an improvement wherein the diameter of the circular power takeoff ring is smaller than the diameter of the circular tracks, and said power takeoff ring rotates in said annular space between the circular tracks and the vertical supports.

In an eleventh preferred embodiment, there is provided in connection with the ninth preferred embodiment, an improvement wherein the diameter of the circular power takeoff ring is larger than the diameter of the circular tracks.

In a twelfth preferred embodiment, there is provided in connection with the first preferred embodiment, an improvement wherein the vertical airfoils extend vertically above an uppermost circular track and vertically below a lowermost circular track.

In a thirteenth preferred embodiment, there is provided in connection with the first preferred embodiment, an improvement wherein said generators have a power takeoff roller positioned in rolling communication with the rotatable circular power takeoff ring.

In a fourteenth preferred embodiment, there is provided in connection with the thirteenth preferred embodiment, an improvement wherein the power takeoff roller on the generator is formed of steel.

In a fifteenth preferred embodiment, there is provided in connection with the fourth preferred embodiment, an improvement wherein the grooved rollers on the trucks are formed of 4130 chrome alloy steel, whereby to minimize rotational friction with the truck while matching material hardness to its mating surface to decrease cyclical wear and tear.

In a sixteenth preferred embodiment, there is provided in connection with the first preferred embodiment, an improvement wherein the vertical airfoils have a constant cross-section over their length.

In a seventeenth preferred embodiment, there is provided in connection with the sixteenth preferred embodiment, an improvement wherein the vertical airfoils have profile cut foam core which are first covered with carbon fiber unidirectional doublers to combat bending stresses followed by an outer layer of woven fabric to resist tortional loading, followed by a layer of mylar to provide a smooth finish.

In an eighteenth preferred embodiment, there is provided in connection with the seventeenth preferred embodiment, an improvement wherein the vertical airfoil is vacuum bagged to evenly squeeze excess epoxy resin from the impregnated fabric.

In a nineteenth preferred embodiment, there is provided in connection with the seventeenth preferred embodiment, an improvement wherein plywood or metal inserts are incorporated into the foam cores to reinforce attachment points of the airfoils to the trucks.

In a twentieth preferred embodiment, there is provided in connection with the first preferred embodiment, an improvement wherein individual generators are vertically movably mounted, whereby to facilitate lowering and raising of the generator for maintenance, repair and replacement.

In the orbital track turbine of the present invention operating in the Savonius mode, the double airfoils are in a "V" shape but there is a gap left at the vertex of the "V". This gap allows air to trickle in and relieve the vacuum, but does not substantially reduce performance. Large amounts of air (which would rob performance) cannot move through this gap rapidly because of viscous effects. However, the small amounts of air needed to negate a partial vacuum can get through, which results in a substantial improvement in efficiency. In the orbital track turbine of the present invention, it is possible to transition from the "V"/Savonius configuration to the parallel/biplane configuration once the wind conditions are high enough and the turbine has achieved a sufficiently high Tip Speed Ratio (TSR).

DETAILED DESCRIPTION OF THE INVENTION

Figure 1:
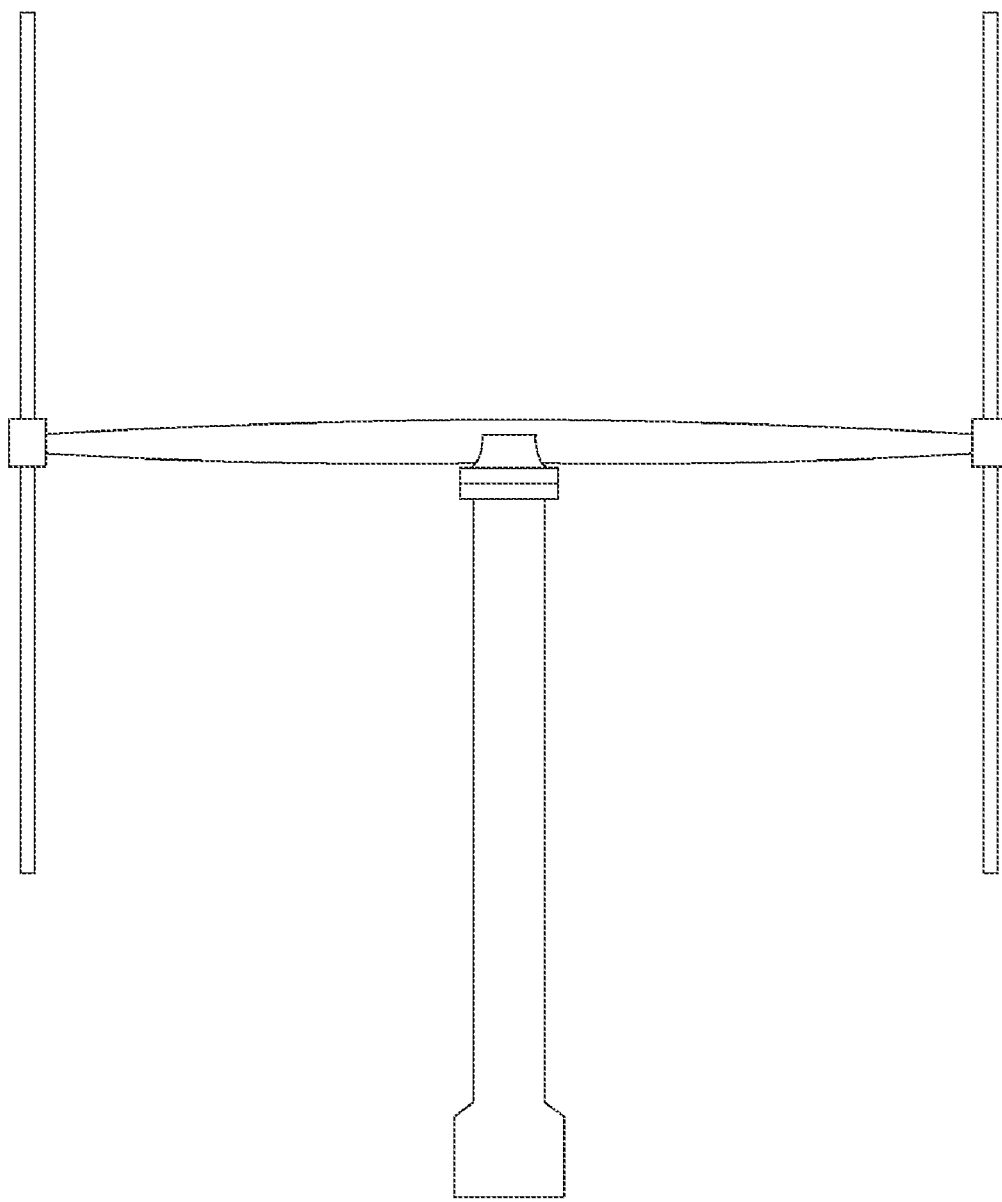
FIG. 1 is a conventional H-shaped wind turbine using turbine blades at each end of a cross-member which in turn is mounted on top of a vertical tower.
Figure 2:
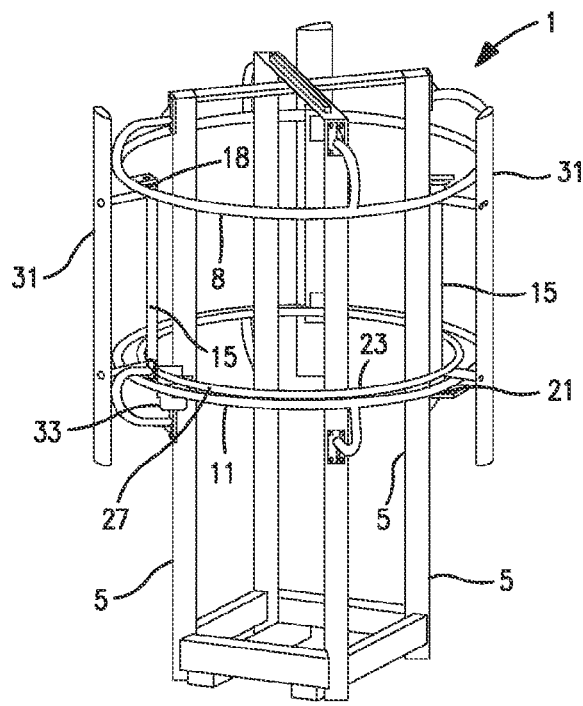
FIG. 2 is a perspective view of an orbital track wind turbine of the present invention, illustrating the spaced circular tracks upon which a truck is mounted in rolling engagement with the tracks, a single airfoil, and a power takeoff ring connected to the trucks.

An orbital track wind turbine according to the present invention is shown generally at 1 in perspective view FIG. 2.

The entire wind turbine is supported by a plurality of vertical supports 5 which are normally anchored to the ground by a solid foundation (not shown). The number and spacing of vertical supports varies depending upon the diameter and height of the wind turbine 1, the only limitation being that a sufficient number of vertical supports be used to hold the orbital track turbine solidly in place.

Fixedly mounted on vertical supports 5 are at least two parallel spaced circular tracks, an upper circular track 8 and a lower circular track 11. Circular tracks 8 and 11 are coaxial with one another and are positioned on the vertical supports 5 in parallel horizontal planes (not shown). Although the circular tracks 8 and 11 can be of any suitable material and have any suitable cross-sectional shape, it is preferred that the tracks be formed from round steel pipe.

Any suitable material of construction can be used in forming the orbital tracks and rollers in the orbital track turbine of the present invention. For example, the tracks could be formed of titanium or any other suitable metal, and the rollers on the trucks can be formed of polymeric materials, such as nylon in order to reduce the mechanical noise of the turbine. Additionally, the turbine blades can be formed of metals such as aluminum or from a combination of glass fibers and carbon fibers embedded in a polymeric matrix.

A plurality of trucks shown generally at 15 extend between circular tracks 8 and 11 (FIG. 2). Each of trucks 15 preferably have at least two grooved rollers 18 and 21 which have grooves formed with chamfered walls (FIGS. 2-12). Rollers 18 are required to carry the rotating mass of the wind turbine while riding on the orbital tracks 8 and 11. Rollers 18, 21 also carry both the gravitational loads of the mass as well as centripetal loading associated with rotational motion.

Figure 7:
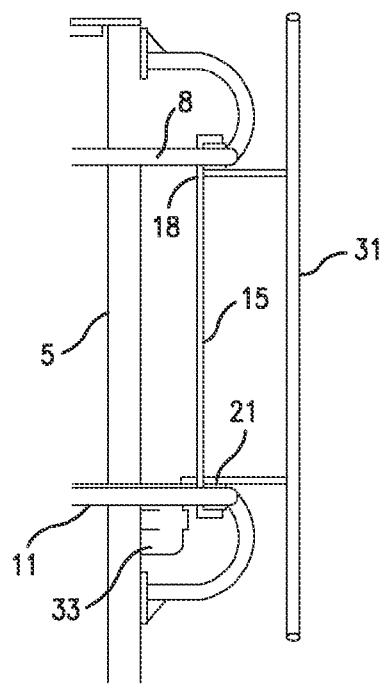
FIG. 7 is a partial side view of an orbital track turbine of the present invention, illustrating support brackets for the orbital tracks, and truck and rollers in rolling engagement with the orbital track.
Figure 8:
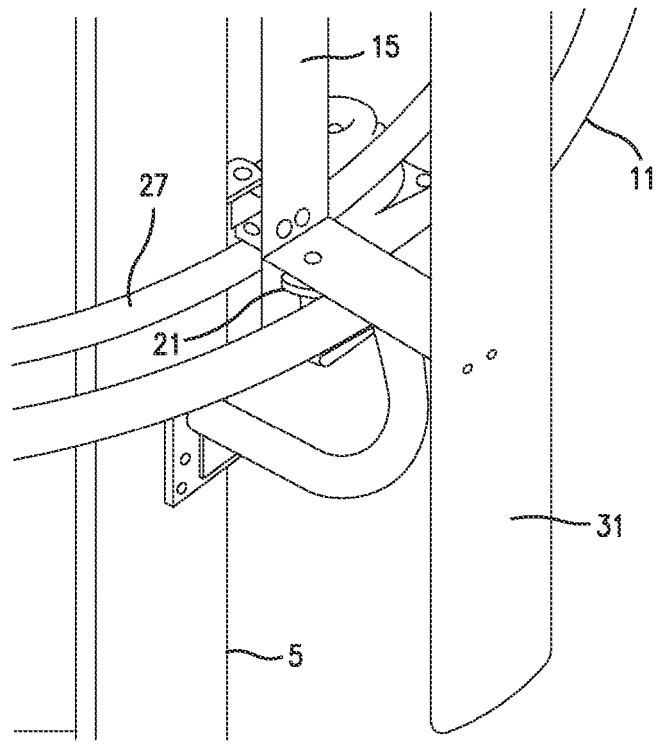
FIG. 8 is a partial perspective view of a lower section of an orbital track turbine of the present invention, illustrating the roller riding on a lower orbital track, and the attachment of a power takeoff ring to the truck upon which the roller is mounted.
Figure 9:
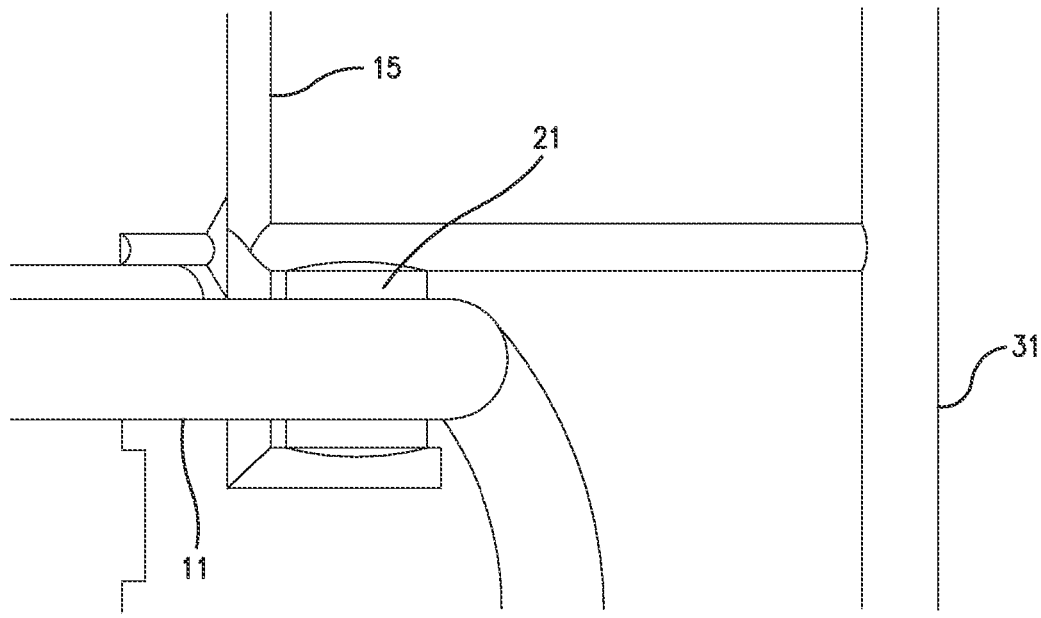
FIG. 9 is a partial side view of an orbital track turbine of the present invention, illustrating a lower portion of a truck, roller, and airfoil, and the connection between the airfoil and a power takeoff ring.
Figure 10:
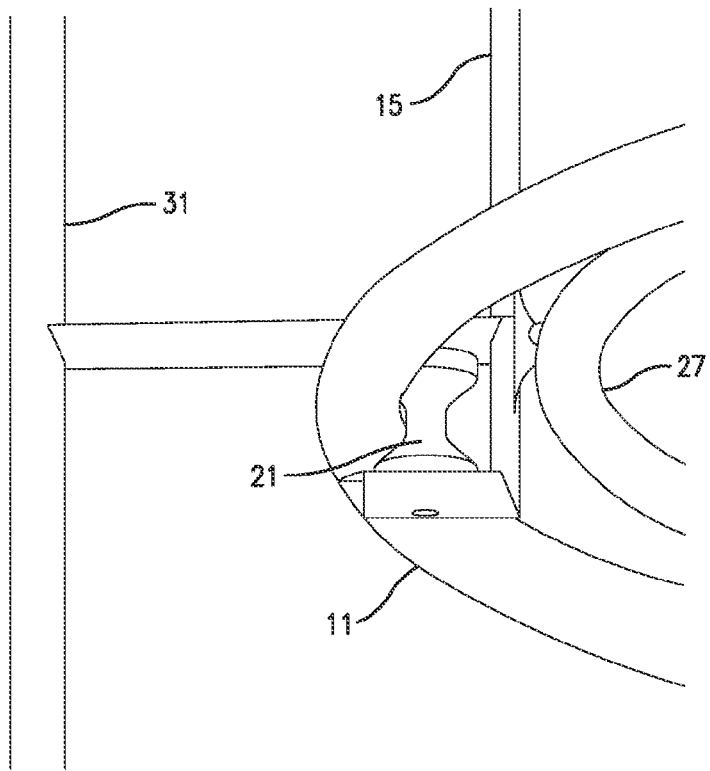
FIG. 10 is a partial perspective view of an orbital track turbine of the present invention, illustrating the connection between the truck, airfoil, and power takeoff ring.
Figure 11:
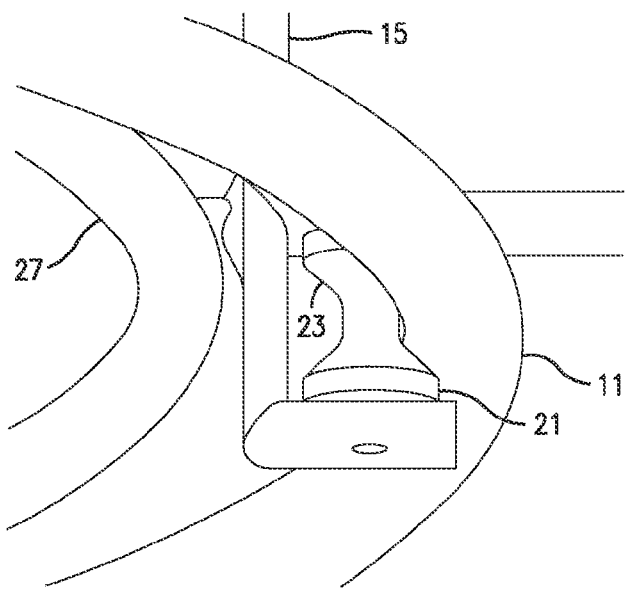
FIG. 11 is a partial perspective view of an orbital track turbine of the present invention as viewed upwardly, illustrating the configuration of a lower roller on the truck and the connection between the power takeoff ring and the truck.
Figure 12:
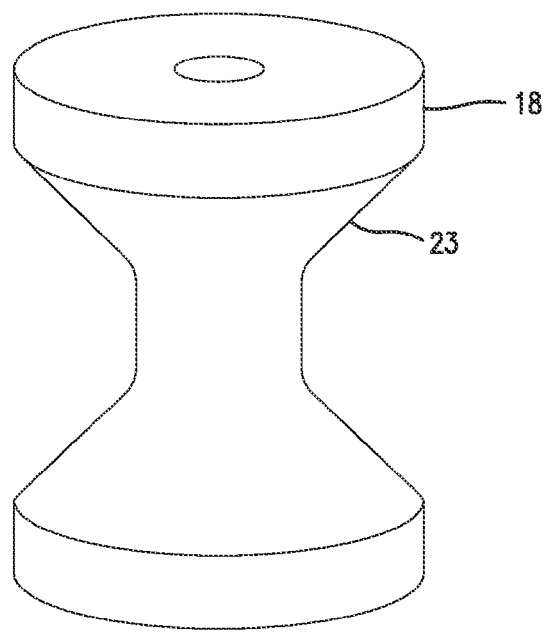
FIG. 12 is a perspective view of a grooved roller mounted on a truck in an orbital track turbine of the present invention.
Figure 23:
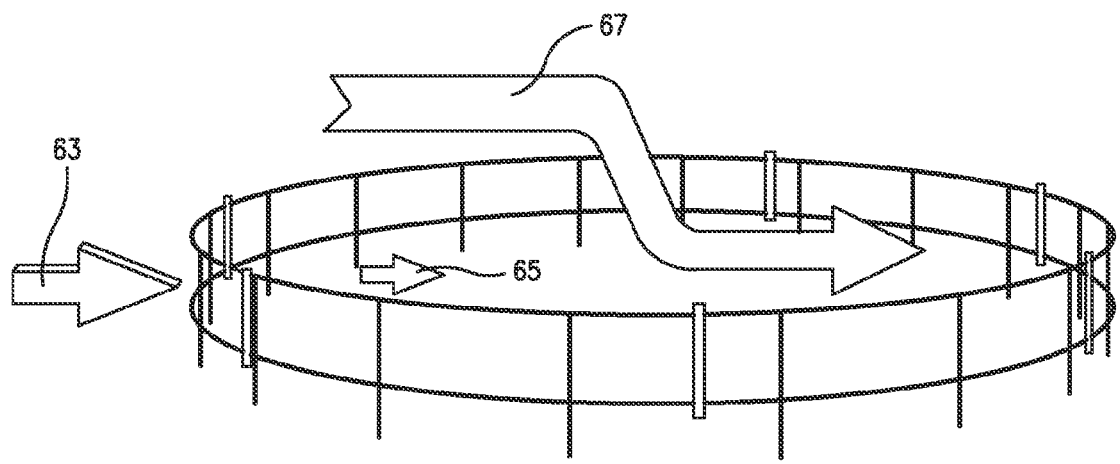
FIG. 23 is a perspective view of an orbital track turbine of the present invention, illustrating by a large outer arrow the full wind strength and a small arrow of reduced strength wind, a second large arrow illustrating wind energy coming from free stream flow above the turbine.

In a preferred embodiment, roller 18 incorporates a groove with a 45-degree chamfered wall 23 (FIGS. 11 and 23). This wall 23 acts as a load carrying face since the weight of the truck and attachments thereto is carried on wall or face 23 (FIG. 7).

A circular power takeoff ring 27 which is coaxial with circular tracks 8 and 11 is attached to truck 15 (FIGS. 2-4, and 6). Power takeoff ring 27 is rotatable in a horizontal plane about its central axis (not shown).

A plurality of vertical airfoils 31 extend around circular tracks 8, 11, with each of airfoils 31 being attached to a truck 15 and in turn to power takeoff ring 27. (FIGS. 2-9 and 24)

One or more generators or dynamotors 33 are mounted so that a power takeoff roller 36 thereon is in rolling engagement with a surface of power takeoff ring 27 (FIGS. 2, 4, 7, 13). In a preferred embodiment, power takeoff ring 27 is fabricated from round steel pipe, and power takeoff ring 27 is rotatable in a substantially horizontal plane between spaced circular tracks 8, 11 (FIG. 2).

In the conventional horizontal axis wind turbines it is necessary to move the heavy mass of the generator and accelerate this mass before any power can be generated. Another idea discussed in the prior art is to use a linear generator. In the present invention, the generator itself is held in a fixed position and only the rotor is moved along with the airfoils.

Figure 4:
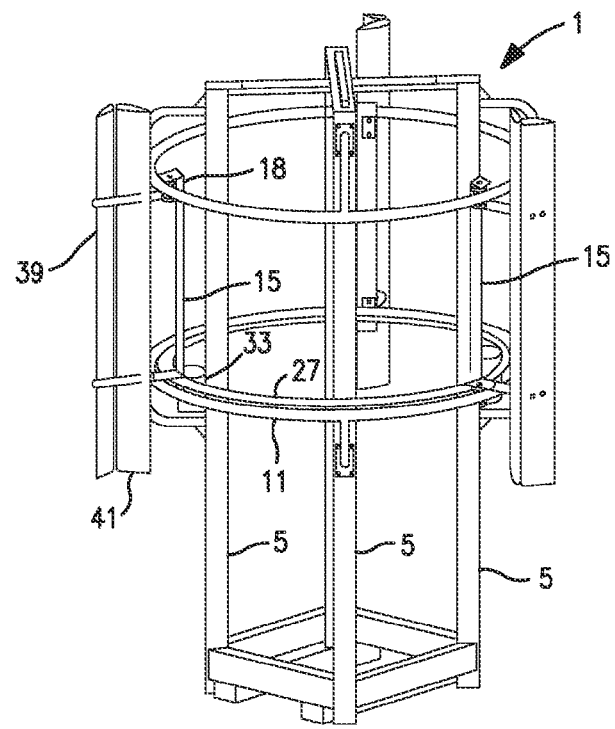
FIG. 4 is a side perspective view of an orbital track turbine of the present invention, illustrating a double airfoil with the airfoils rotated on their vertical axis to form a V configuration, in which the airfoils act as a drag-type, Savonius turbine.
Figure 5:
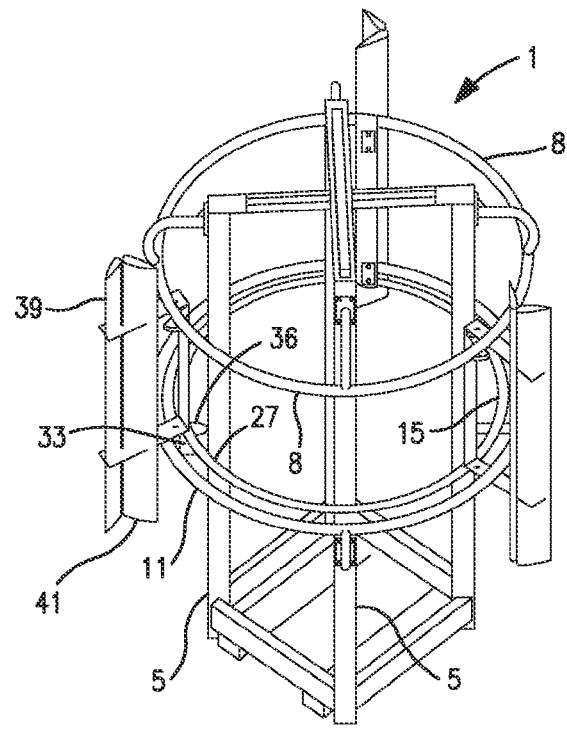
FIG. 5 is a top perspective view of an orbital track turbine of the present invention, illustrating a double airfoil configuration with the airfoils at right angles to one another.
Figure 26:
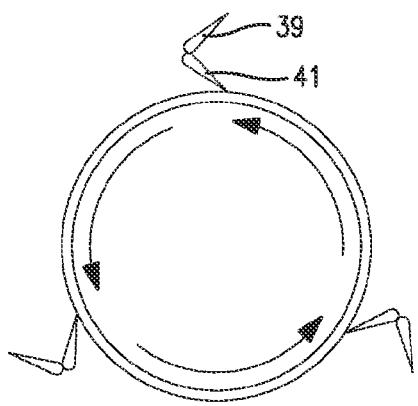
FIG. 26 is a top view of a double airfoil configuration in an orbital track turbine of the present invention, illustrating operation of the airfoils in the Savonius mode.

In another preferred embodiment, a pair of vertical airfoils 39, 41 are pivotal along their vertical axis (FIGS. 4 and 5) to facilitate adjustment of the pitch of the airfoils 39, 41, thereby facilitating the most efficient capture of wind power by the airfoils 39, 41. In a preferred embodiment, airfoils 39, 41 are pivoted until their leading edges approach one another so that the airfoils form a V-shape as shown in FIGS. 4, 5 and 26. This configuration of airfoils facilitates initiation of rotation of the wind turbine of the present invention when the wind is blowing at relatively low speeds, i.e., 1-8 miles per hour.

A key object of the present invention is to keep bending stresses in the airfoils low, thus facilitating the use of lightweight and low cost airfoils. An additional orbital track can also be used any time the bending stresses in the airfoils rise above a certain level. This can be seen in FIG. 27.

Figure 3:
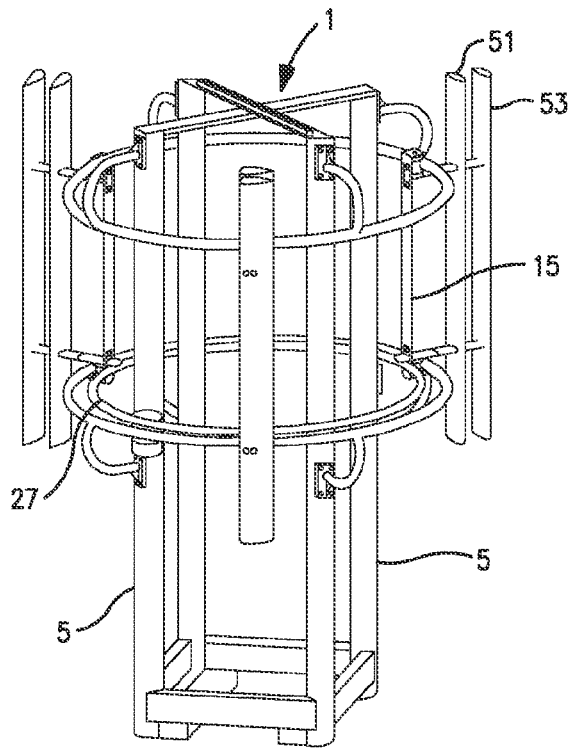
FIG. 3 is a side perspective view of an orbital track turbine of the present invention, illustrating the use of a double airfoil, i.e., a biplane configuration.
Figure 15:
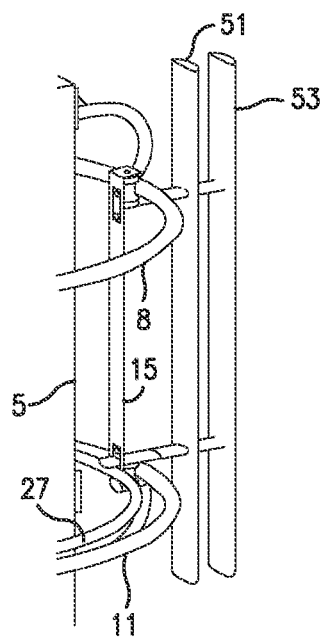
FIG. 15 is a partial perspective view of an orbital track turbine of the present invention, illustrating a preferred embodiment employing double airfoils.
Figure 16:
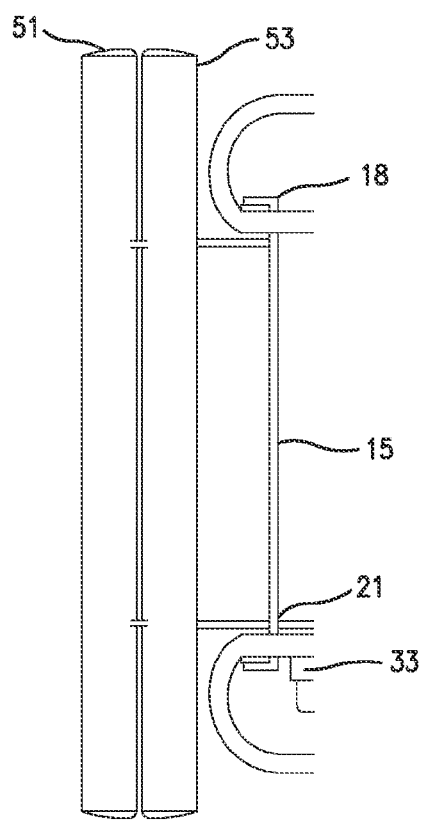
FIG. 16 is a perspective view of a partial section of an orbital track turbine of the present invention, illustrating the manner in which the double airfoil is connected to trucks and a power takeoff ring.
Figure 24:
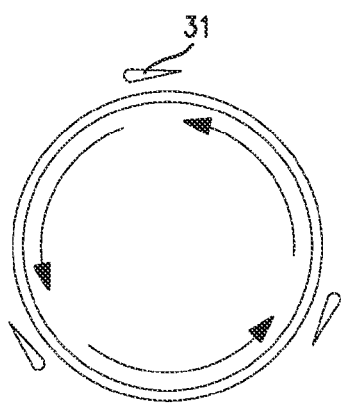
FIG. 24 is a top view of a single airfoil configuration in an orbital track turbine of the present invention.
Figure 25:
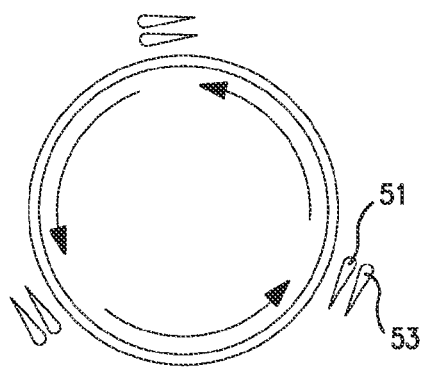
FIG. 25 is a top view of a double airfoil configuration in an orbital track turbine of the present invention.

FIGS. 2 and 24 show an orbital track turbine of the present invention using single airfoils, i.e., monoplane configurations. FIGS. 3 and 25 show a wind turbine using a double airfoil, i.e., biplane with airfoils 51, 53 (FIGS. 3, 15, 16) configuration. According to biplane theory, it is possible to obtain 40% more lift with a biplane as opposed to a monowing. Usually this is not worth doing in wind turbines because of the cost, mass, and drag of the second airfoil. In the orbital track turbine of the present invention, the airfoils are lightweight, low cost, and thin in cross-section which reduces their drag penalty. Consequently, biplane configurations are advantageous in many implementations of the orbital track turbine of the present invention. FIGS. 4 and 5 show the other advantages of a double airfoil, namely, that they can be rotated into a "V" configuration and act as a drag-type, Savonius turbine. FIG. 24 shows a top view schematic of a single airfoil configuration, FIG. 25 shows a double airfoil configuration, and FIG. 26 shows a double airfoil configuration in the Savonius mode.

Figure 17:
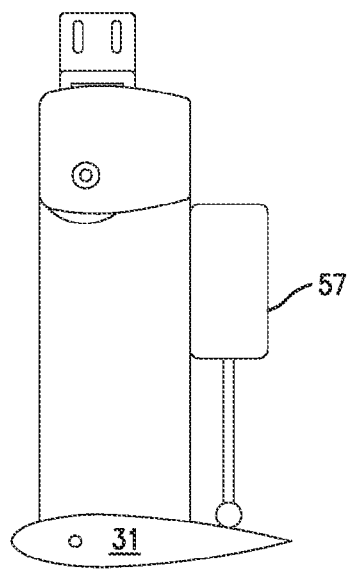
FIG. 17 is a top view of a mechanism for adjusting the pitch of a single airfoil in an orbital track turbine of the present invention.
Figure 18:
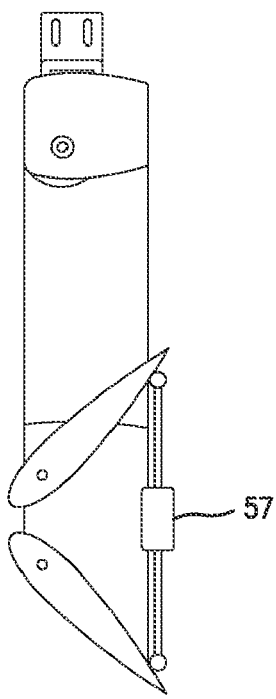
FIG. 18 is a top view of a mechanism for adjusting the pitch of a double airfoil in an orbital track turbine of the present invention.
Figure 19:
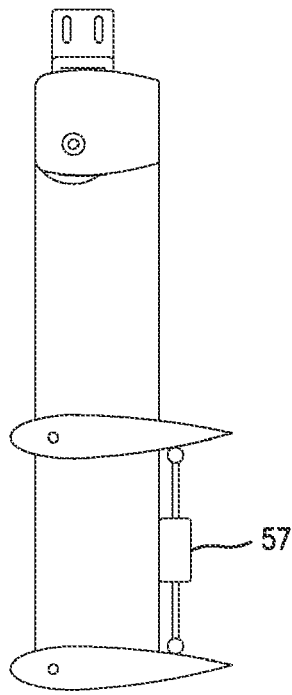
FIG. 19 is a top view of a mechanism for adjusting the pitch of a double airfoil in an orbital track turbine of the present invention, illustrating the double airfoils in a "V" shaped configuration.

FIGS. 17, 18 and 19 show a mechanism 57 for adjusting airfoil pitch. The mechanism can be electromechanical, hydraulic, pneumatic, or any other type. Being able to adjust the pitch of the airfoils facilitates higher turbine efficiencies in lower wind speeds, and at lower tip speed ratios (TSR).

In another preferred embodiment, generator 33 (FIGS. 2, 4, 6, 7 and 13) can be a dynamotor which powers initial rotation of the power takeoff ring and wind turbine at low air speeds. In another preferred embodiment, the diameter of spaced circular tracks 8, 11, is larger than the diameter (spacing from a central axis) of vertical supports 5. This configuration leaves an annular space between circular tracks 8, 11 and vertical supports 5.

Figure 6:
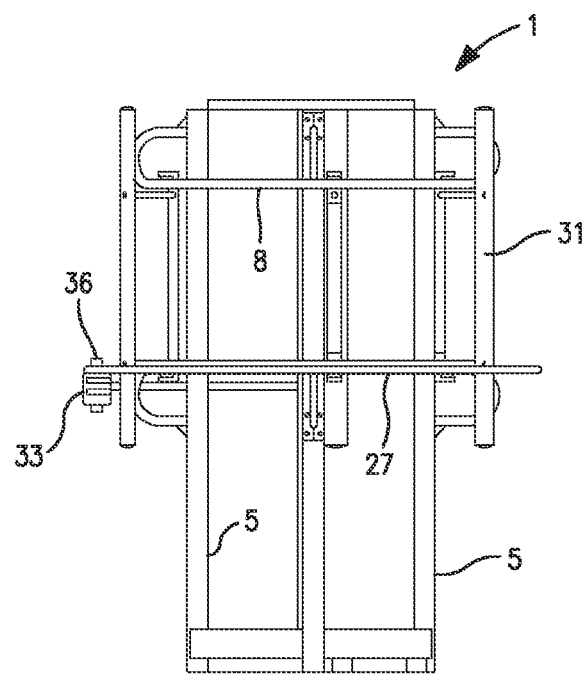
FIG. 6 is a side view of an orbital track turbine of the present invention, illustrating an embodiment with the power takeoff ring having a larger diameter than an upper orbital track, and the airfoils positioned inside of the power takeoff ring and outside of an upper orbital ring.
Figure 13:
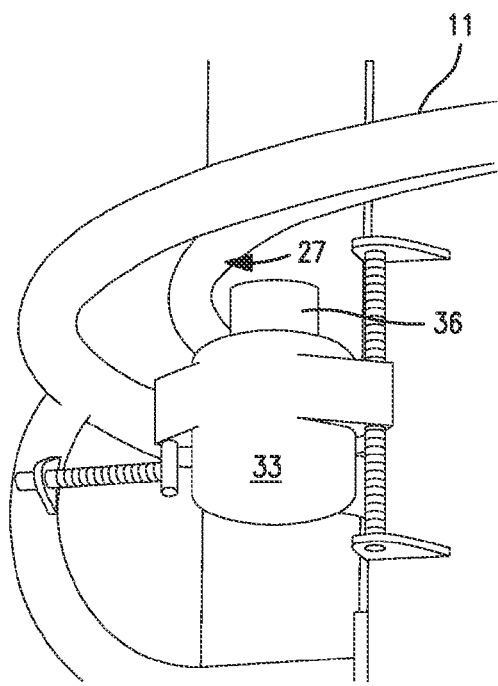
FIG. 13 is a partial perspective view of an orbital track turbine of the present invention, illustrating the mounting of a generator in operative engagement with a power takeoff ring.
Figure 14:
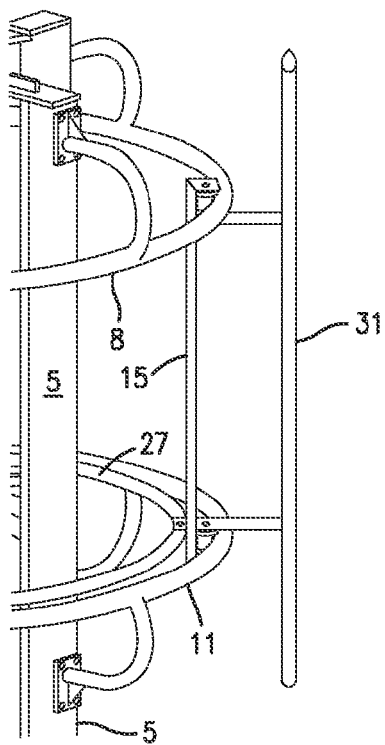
FIG. 14 is a perspective view of an orbital track turbine of the present invention, illustrating the configuration of the truck, power takeoff ring, and airfoil when the truck is mounted on a pair of orbital tracks.

It is still another preferred embodiment shown in FIG. 6, the diameter of the circular power takeoff ring 27 is larger than the diameter of circular tracks 8, 11. Preferably, vertical airfoils 31, 39, 41, 51 and 53 extend vertically above an uppermost circular track 8 and below a lowermost circular track 11. In a preferred embodiment, the power takeoff roller 36 on generator 33 is formed of steel, more preferably of 4130 chrome alloy steel. (FIGS. 6, 13)

Vertical airfoils 31, 39, 41, 51, and 53 preferably have a constant cross-section over their entire length, and have their profile core cut from foam which is covered with carbon fiber unidirectional doublers, with wood or metal inserts in the foam cores at points of attachment to trucks 15.

Preferably, each of generators 33 can be raised from the ground to their operable mounted positions in contact with the power takeoff ring, and also lowered to the ground by means of a cable or line, whereby to facilitate ease of maintenance.

Figure 28:
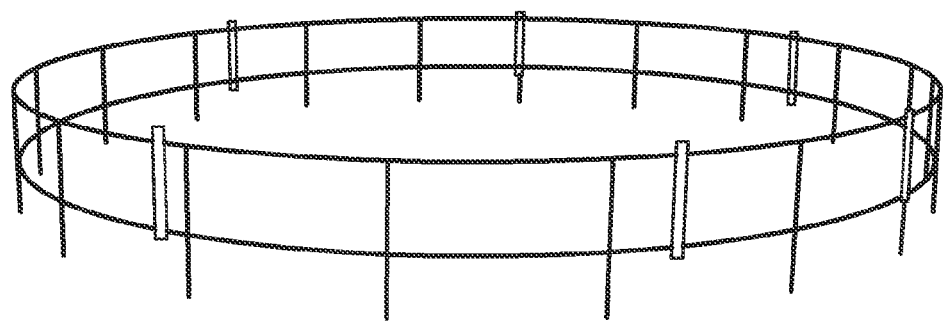
FIG. 28 is a perspective view of an orbital track turbine of the present invention, illustrating a configuration where the airfoils are inside of the orbital tracks.

In yet another preferred embodiment of the orbital track turbine of the present invention, the airfoils are positioned inside of the orbital tracks as illustrated in FIG. 28. Additionally, the power takeoff ring employed in the orbital track turbine of the present invention can be located on the outside of the airfoil as shown in FIG. 6.

INDUSTRIAL APPLICABILITY

In the horizontal axis wind turbine (HAWT), the monopole needs to counteract the tip over moment from the wind by having a large, deep footing. The orbital track turbine of the present invention employs a broad base and hence the footing is lower cost and designed to keep the turbine from sinking into the ground. The HAWT has its high mass items (rotors, gear boxes, generators) all at the top of a very high tower. In contrast, the orbital track turbine of the present invention has the center of gravity of the high mass items positioned low on the tower. Also, the tower is more like a broadly based truss and hence more structurally efficient than a monopole.

In a HAWT wind turbine, the majority of the power is produced in the outer one-third of the rotor, since the inner two-thirds are at a lower velocity. An advantage of the orbital track turbine of the present invention is that the entire airfoil sees the maximum tangential velocity of the wind turbine, hence, each part of the airfoil produces the same amount of power. Another advantage of the orbital track turbine of the present invention is that the airfoils can be transported easily and brought to the field in sections and assembled into one long airfoil. This is possible because the airfoil has a constant cross-section shape from top to bottom.

Preferably a power takeoff system employed in the orbital track turbine of the present invention employs a generator which can be raised or lowered to the ground for ease of servicing. The generator can be mounted between springs to allow tolerance for up and down travel of the power takeoff ring during operation. Preferably, a radial tensioning system including the use of springs (not shown) can be used to hold the generator 33 against the power takeoff ring 27.

In a preferred embodiment, the power takeoff ring 27 can be supported by rollers (not shown) underneath it so that a lighter weight power takeoff ring can be used.

Preferably, the power takeoff ring can be formed from a round steel pipe. In another preferred embodiment, the power takeoff ring 27 can be replaced by either a chain, gear, or notched belt such as used in automotive applications.

The orbital track turbine of the present invention has little or no cantilever in the airfoils which minimizes stresses on the airfoils. As a consequence, such airfoils experiencing low stress can be lighter weight, made from low-cost materials, and made longer to capture more energy with the same mass.

Another aspect of the invention is that of wind regeneration. One of the reasons that Vertical Access Wind Turbines (VAWT) usually have a lower efficiency than HAWT is that on the VAWT the windward side of the turbine sees the full strength of the wind while the leeward side of the turbine sees wind that has had its energy reduced by the windward side. Orbital track turbine technology is concerned with making very large turbines. If an orbital track turbine has a diameter of 3 to 5 times the highest point reached by the airfoil, then the leeward side of the orbital track turbine will see fresh, regenerated wind. This regenerated wind will allow the turbine to generate more power and allow the turbine to close the gap in performance efficiency between HAWTs and VAWTs (i.e., the OTT). This concept is illustrated in FIG. 23. The large arrow 63 on the left represents the full strength wind. The small arrow 65 represents the reduced strength wind. The second big arrow 67 is meant to show that the wind energy is coming from the free streamflow above the turbine to regenerate the wind in the plane of the turbine.

Figure 27:
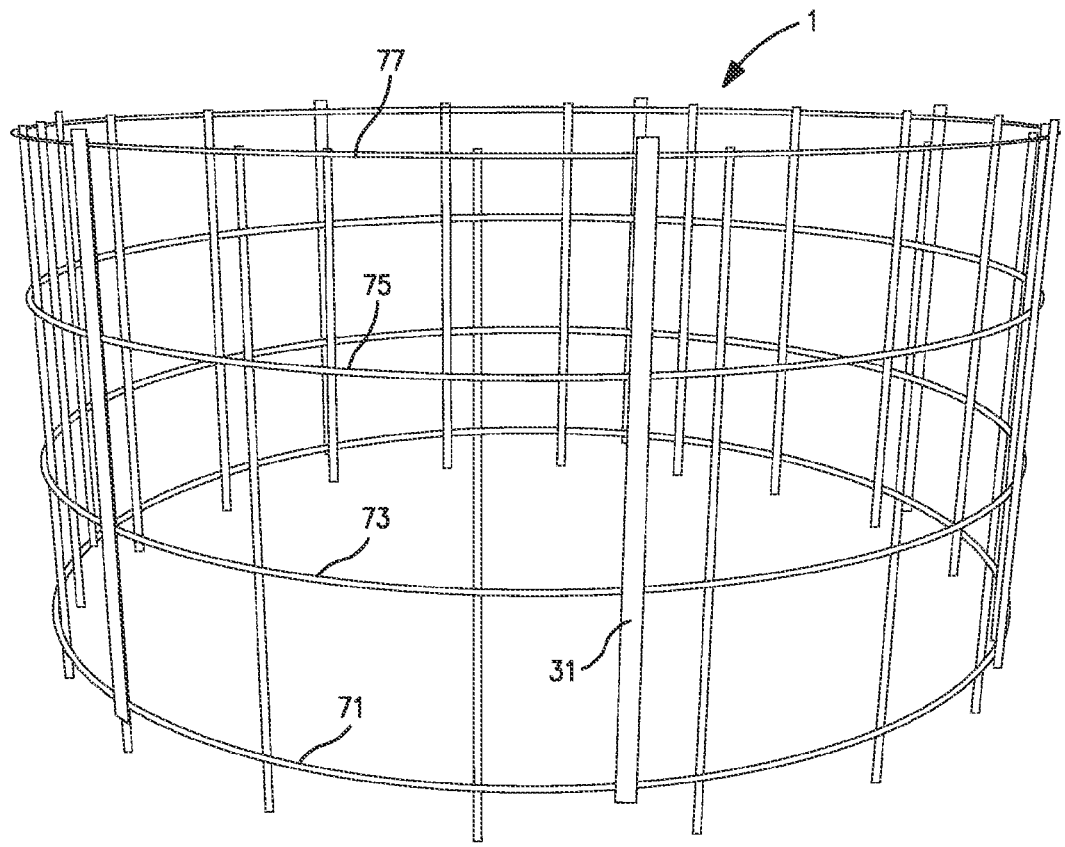
FIG. 27 is a perspective view of an orbital track turbine of the present invention illustrating the use of four orbital tracks.

In a preferred embodiment, an additional orbital track 71, 73, 75 and 77 can be used to keep stress/loads in airfoils low (see FIG. 27). These tracks remove the need for a horizontal support arm that is used in a H-rotor wind turbine. The use of the orbital tracks eliminates the major source of parasite drag as well as the inertia associated with the mass of this arm. Also, the use of an orbital track allows an easier startup in light winds, and more power can be used in producing electricity rather than accelerating dead weight of a long arm as in the H-rotor.

The trucks 15 supporting the airfoil uses rollers designed to handle gravity of the weight of the airfoil assembly as well as the centripetal load resulting from spinning of the airfoils. Preferably, these rollers are formed of steel with an hourglass shape (not shown).

Minimizing the stresses on the airfoil facilitates the use of thinner airfoils having lower mass and lower drag. In contrast, horizontal axis wind turbines normally have constantly changing cross-sections and twist in the blades, and only about one-third of the rotor provides most of the power. In the orbital track turbine of the present invention, every inch of the blade is at maximum tangential velocity and provides the same power as every other inch.

The orbital track turbine of the present invention can be installed around a city as well as on the top of mountains, mountain passes, and around circular pivot agricultural fields. Additionally, the orbital track wind turbines of the present invention are well suited to be used on floating ocean platforms because they can be distributed around a broad base.

Figure 20:
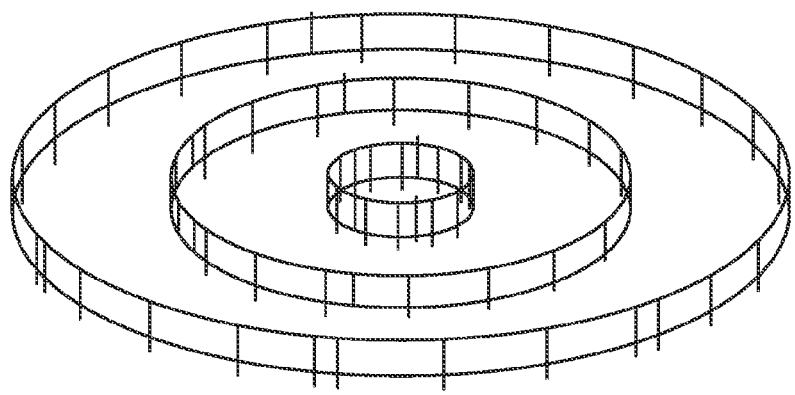
FIG. 20 is a perspective view of three orbital track turbines of the present invention, illustrating a concentric configuration of the three orbital track turbines.
Figure 21:
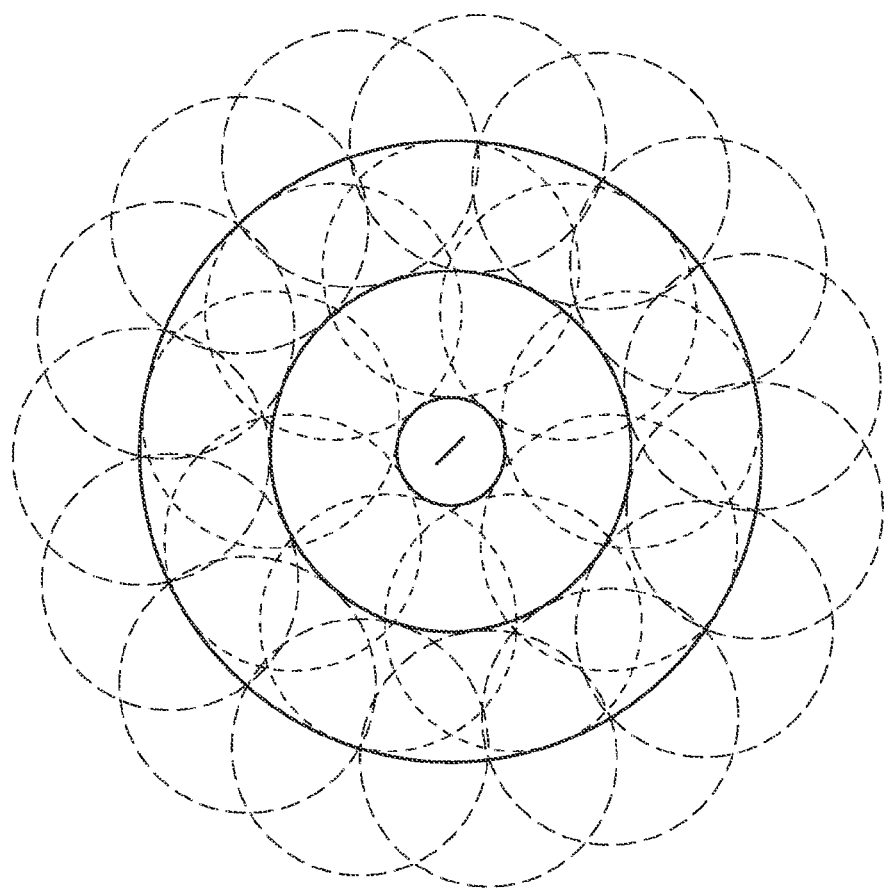
FIG. 21 is a top view of a wind farm in which traditional HAWTS are placed in concentric circles.
Figure 22:
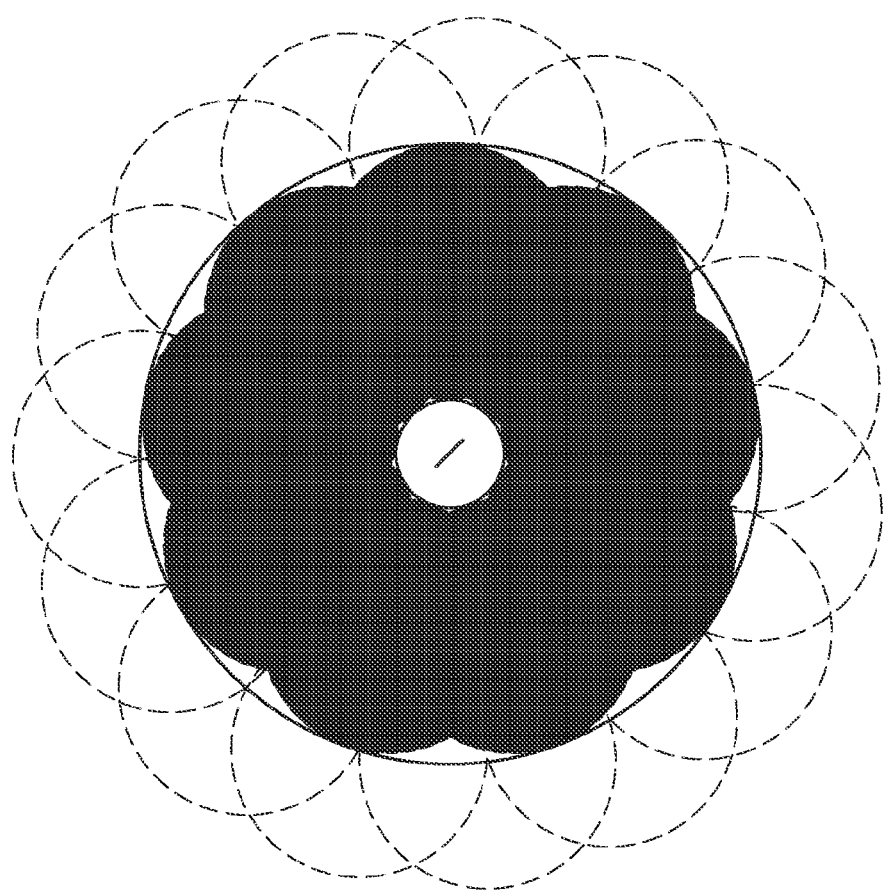
FIG. 22 is a top view of the wind farm of FIG. 28, with the exclusion zones around each turbine being shaded to illustrate how the HAWTS are spaced.

An important aspect of the present invention is the optimum use of real estate in a wind farm. Traditional Horizontal Axis Wind Turbines must be positioned so that they do not aerodynamically interfere with one another. Wind turbines typically must have the spacing of 3 to 5 rotor diameters between them to avoid aerodynamic interference. FIG. 20 shows an embodiment of the present invention where orbital track turbines are concentric. They have the perfect orientation no matter which direction the wind comes from. FIG. 21 provides a wind farm in which traditional HAWTs are placed in concentric circles. The orbital track turbine in FIG. 20 and the HAWT in FIG. 21 are the same height, and have the same size airfoils and are spaced using the same rules of separating the turbines. FIG. 22 shows the exclusion zones around each turbine as shaded to make it more clear how they are spaced. The bottom line is that all other factors being equal, the Orbital Track Turbine technology can generate 25% more power on the same size field.

An important advantage of the orbital track turbine of the present invention is that it does not need to vector into the wind and, therefore, doesn't suffer reduced output while it is changing direction. Also, the orbital track turbine can operate at higher wind speeds, because it is not cantilevered and hence experiences less bending stresses. As the tip speed ratio increases, the relative wind seen by the airfoils is different from the actual direction of the free wind. This eliminates blade stalling at a sufficiently high TSR.

An advantage of the large diameter power takeoff ring on a large orbital track turbine is that the power takeoff ring has a large tangential velocity that allows it to act like a gear that spins the generators at high rpm as is preferred for highly efficient power generation.

Preferably, it is desired to employ conventional active airfoil pitch control (not shown) to increase efficiency at low wind speed/low tip speed ratio. Pitch control allows self starting by pitching downwind blades to assume the position of a flat plate relative to the wind. The airfoils preferably are positioned in a "V" configuration if the system is a double airfoil/biplane design. The "V" configuration provides a real advantage since the airfoil does not need to change pitch/configuration when moving upwind or downwind. Active pitch control is more feasible as the diameter of the orbital track turbine is increased.

Figure 29:
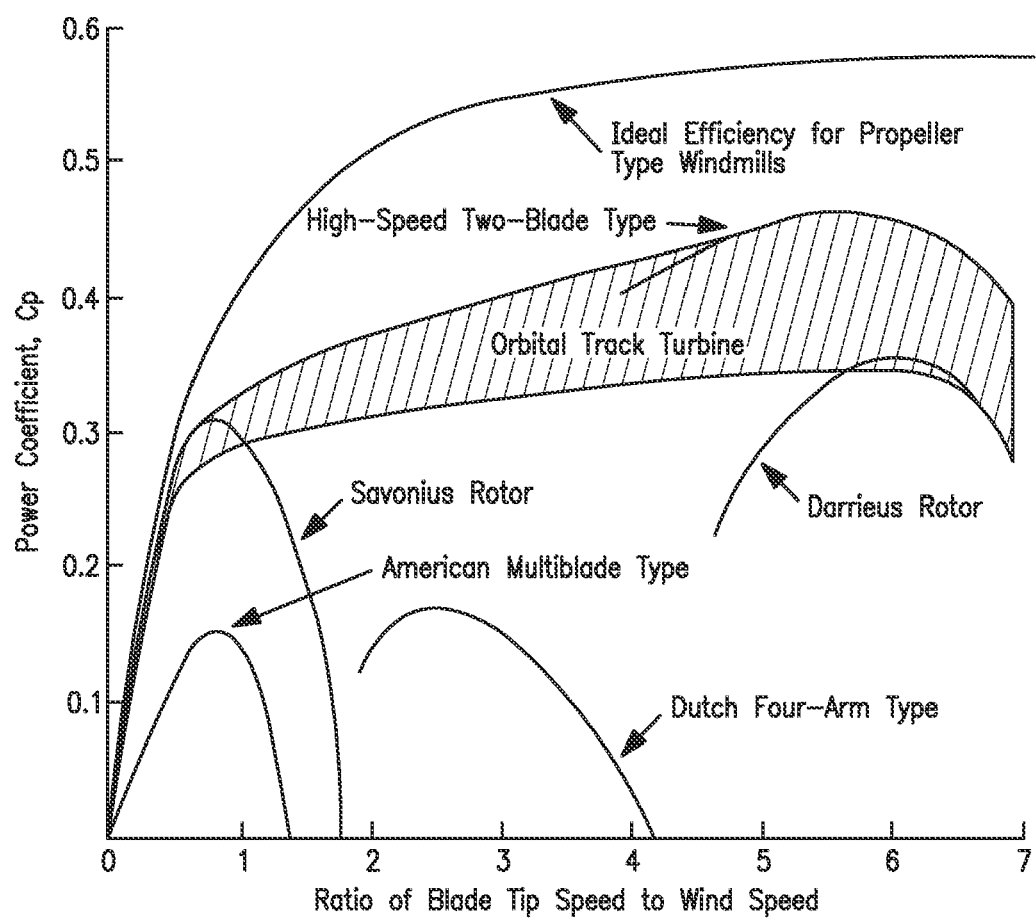
FIG. 29 is a graph showing the ratio of blade tip speed to wind speed versus the power coefficient for conventional wind turbines as compared with an orbital track turbine of the present invention.

An advantage of the orbital track turbine of the present invention is the reduction in cost in having constant cross-section airfoils. Since these airfoils experience lower bending loads, they can be extruded from aluminum or formed from composite materials. These efficiencies are illustrated in FIG. 29 showing the power coefficient at various ratios of blade tip speed to wind speed for various conventional rotor systems and for the orbital track turbine of the present invention.

LIST OF DRAWING ELEMENTS

1: Orbital Track Wind Turbine
5: vertical supports
8: upper circular track
11: lower circular track
15: trucks
18: upper grooved roller
21: lower grooved roller
23: 45° chamfered wall
27: circular power takeoff ring
31: vertical airfoils
33: generator or dynamotor
39: airfoil (which is pivoted to form a V-shape with airfoil 41)
41: airfoil (which is pivoted to form a V-shape with airfoil 39)
51: airfoil (making up double airfoil structure)
53: airfoil (making up double airfoil structure)
57: mechanism for adjusting airfoil pitch
63: large arrow representing full strength wind
65: small arrow representing reduced strength wind
67: second big arrow representing wind energy coming from free streamflow above turbine 71,
73, 75, 77: additional orbital tracks

What is claimed is:

1. An orbital track wind turbine for generation of electrical energy from wind power, said wind turbine comprising:
    (a) a plurality of spaced vertical supports;
    (b) at least two parallel spaced circular tracks fixedly secured to said vertical supports, said circular tracks being coaxial with one another and positioned in parallel horizontal planes;
    (c) a plurality of trucks extending between said circular tracks, each of said trucks having at least two grooved rollers which partially surround said circular tracks and operate in rolling engagement therewith;
    (d) a circular power takeoff ring coaxial with said circular tracks, said circular power takeoff ring being attached to said truck and being rotatable in a horizontal plane about its central axis;
    (e) a plurality of vertical airfoils extending around said circular tracks, each of said airfoils being attached to a truck and said power takeoff ring;
    (f) one or more generators being rotatably connected to said power takeoff ring, whereby wind power striking the airfoils causes rotational movement of both the airfoils and attached power takeoff ring and conversion of wind generated rotation of the power takeoff ring and generators to electrical energy.

2. The orbital track wind turbine of claim 1, wherein the circular tracks and power takeoff ring are formed from round steel pipe.

3. The orbital track wind turbine of claim 1, wherein said spaced circular tracks have approximately the same diameter, and the circular power takeoff ring is rotatable in a substantially horizontal plane between the spaced circular tracks.

4. The orbital track wind turbine of claim 1, wherein said grooved rollers on the truck are formed of steel and have chamfered walls of between about 30-60 degrees, whereby to transmit both gravitational loads of the mass of the truck and airfoil, and the centripetal loads of the airfoil, truck and power takeoff ring.

5. The orbital track wind turbine of claim 4, wherein each truck has attached thereto a pair of vertically extending airfoils.

6. The orbital track wind turbine of claim 5, wherein said pair of vertical airfoils are pivotal along their vertical axis, whereby adjustment of the pitch of the airfoils can be made to facilitate the most efficient capture of wind power by the airfoils.

7. The orbital track wind turbine of claim 6, wherein each pair of vertical airfoils are pivotal along their vertical axis until the leading edges thereof approach one another, and the cross-section of these airfoils form a V-shape to facilitate initiation of rotation.

8. The orbital track wind turbine of claim 1, wherein said generator is a dynamotor which can be operated as a motor to initiate rotation of the power takeoff ring when there is insufficient wind to initiate operation of the wind turbine.

9. The orbital track wind turbine of claim 1, wherein the diameter of the spaced circular tracks is larger than the diameter of the vertical supports, and there is an annular space between the circular tracks and the vertical supports.

10. The orbital track wind turbine of claim 9, wherein the diameter of the circular power takeoff ring is smaller than the diameter of the circular tracks, and said power takeoff ring rotates in said annular space between the circular tracks and the vertical supports.

11. The orbital track wind turbine of claim 9, wherein the diameter of the circular power takeoff ring is larger than the diameter of the circular tracks.

12. The orbital track wind turbine of claim 1, wherein the vertical airfoils extend vertically above an uppermost circular track and vertically below a lowermost circular track.

13. The orbital track wind turbine of claim 1, wherein said generators have a power takeoff roller positioned in rolling communication with the rotatable circular power takeoff ring.

14. The orbital track wind turbine of claim 13, wherein the power takeoff roller on the generator is formed of steel.

15. The orbital track wind turbine of claim 4, wherein the grooved rollers on the trucks are formed of 4130 chrome alloy steel, whereby to minimize rotational friction with the truck while matching material hardness to its mating surface to decrease cyclical wear and tear.

16. The orbital track wind turbine of claim 1, wherein the vertical airfoils have a constant cross-section over their length.

17. The orbital track wind turbine of claim 16, wherein the vertical airfoils have profile cut foam cores which are first covered with carbon fiber unidirectional doublers to combat bending stresses followed by a layer of woven fabric to resist tortional loading, followed by an outer layer of mylar to provide a smooth finish.

18. The orbital track wind turbine of claim 17, wherein the vertical airfoil is vacuum bagged to evenly squeeze excess epoxy resin from the impregnated fabric.

19. The orbital track wind turbine of claim 17, wherein plywood or metal inserts are incorporated into the foam cores to reinforce attachment points of the airfoils to the trucks.

20. The orbital track wind turbine of claim 1, wherein individual generators are vertically movably mounted, whereby to facilitate lowering and raising of the generator for maintenance, repair and replacement.

* * * * *